(12) United States Patent
Da et al.

(10) Patent No.: US 11,425,667 B2
(45) Date of Patent: Aug. 23, 2022

(54) INFORMATION INDICATING METHOD, INFORMATION DETERMINING METHOD, TERMINAL AND BASE STATION

(71) Applicant: CHINA ACADEMY OF TELECOMMUNICATIONS TECHNOLOGY, Beijing (CN)

(72) Inventors: Ren Da, Beijing (CN); Zheng Zhao, Beijing (CN); Bin Ren, Beijing (CN); FangChen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 51 days.

(21) Appl. No.: 16/961,625

(22) PCT Filed: Dec. 27, 2018

(86) PCT No.: PCT/CN2018/124271
§ 371 (c)(1),
(2) Date: Jul. 10, 2020

(87) PCT Pub. No.: WO2019/137228
PCT Pub. Date: Jul. 18, 2019

(65) Prior Publication Data
US 2020/0359343 A1    Nov. 12, 2020

(30) Foreign Application Priority Data
Jan. 12, 2018  (CN) .......................... 201810032530.2

(51) Int. Cl.
*H04W 56/00*    (2009.01)
(52) U.S. Cl.
CPC .................................. *H04W 56/00* (2013.01)

(58) Field of Classification Search
CPC ............... H04W 56/00; H04W 72/042; H04W 74/0808; H04W 24/02; H04L 27/2666;
(Continued)

(56) References Cited

U.S. PATENT DOCUMENTS

2019/0159180 A1*  5/2019  Ly .......................... H04W 24/02
2019/0200307 A1*  6/2019  Si ......................... H04L 27/2666
(Continued)

FOREIGN PATENT DOCUMENTS

WO    2017217719 A1    12/2017

OTHER PUBLICATIONS

International Search Report from PCT/CN2018/124271, dated Feb. 12, 2019, with English translation from WIPO.
(Continued)

*Primary Examiner* — Ayaz R Sheikh
*Assistant Examiner* — Louis Samara
(74) *Attorney, Agent, or Firm* — Ladas & Parry, LLP (57) ABSTRACT

An information indicating method, an information determining method, a terminal and a base station are provided. The information indicating method includes: indicating, by using a predetermined parameter of a physical broadcast channel (PBCH) in a first system synchronization block (SSB), whether the first SSB includes associated remaining minimum system information (RMSI); or indicating, by using a predetermined parameter of a PBCH in a first SSB, that the first SSB does not include associated RMSI, and indicating frequency offset information of a synchronization raster where a second SSB is located, where the second SSB is an SSB with the associated RMSI.

18 Claims, 2 Drawing Sheets

(58) Field of Classification Search
CPC ... H04L 5/0051; H04L 27/261; H04J 11/0076
See application file for complete search history.

(56) References Cited

U.S. PATENT DOCUMENTS

| | | | |
|---|---|---|---|
| 2019/0208479 A1* | 7/2019 | Kim | H04W 72/0446 |
| 2020/0068512 A1* | 2/2020 | Xue | H04L 27/261 |
| 2020/0146041 A1* | 5/2020 | Kim | H04W 72/0446 |
| 2021/0007065 A1* | 1/2021 | Ko | H04W 56/00 |
| 2021/0185683 A1* | 6/2021 | Reial | H04W 72/0453 |
| 2021/0307061 A1* | 9/2021 | Huang | H04W 74/006 |

OTHER PUBLICATIONS

Written Opinion of the International Searching Authority from PCT/CN2018/124271, dated Feb. 12, 2019, with English translation from WIPO.
International Preliminary Report on Patentability from PCT/CN2018/124271, dated Jul. 14, 2020, with English translation from WIPO.
"Details on PRB grid offset indication", R1-1720581, 3GPP TSG RAN WG1 Meeting 91, Reno, USA, Nov. 27-Dec. 1, 2017.
"WF on RMSI presence flag", R1-1721684, 3GPP TSG RAN WG1 Meeting 91, Reno, USA, Nov. 27-Dec. 1, 2017.

* cited by examiner

INFORMATION INDICATING METHOD, INFORMATION DETERMINING METHOD, TERMINAL AND BASE STATION

CROSS-REFERENCE TO RELATED APPLICATIONS

This application is the U.S. national phase of PCT Application No. PCT/CN2018/124271 filed on Dec. 27, 2018, which claims a priority to Chinese Patent Application No. 201810032530.2 filed on Jan. 12, 2018, the disclosures of which are incorporated in their entireties by reference herein.

TECHNICAL FIELD

The present disclosure relates to the technical field of communication applications, in particular to an information indicating method, an information determining method, a terminal and a base station.

BACKGROUND

In new-generation radio air interfaces, a system synchronization block (SSB) transmitted from a base station may or may not carry associated remaining minimum system information (RMSI). If an SSB carries the associated RMSI, the SSB is referred to as a cell-defining SSB (CD-SSB). If an SSB does not carry the associated RMSI, the SSB is used for radio resource management (RRM for short) measurement, which is referred to as RRM-SSB herein. The CD-SSB must be transmitted at frequency positions defined as synchronization raster (sync-raster). The RRM-SSB may be transmitted at frequency positions of a common resource block (CRB for short) or at sync-raster frequency positions. Moreover, the sync-raster frequency positions and the CRB frequency positions may overlap at some frequencies.

When a UE attempts to access a certain cell, the UE needs to search for a CD-SSB at sync-raster frequency positions one by one to obtain the RMSI of the cell to be accessed. In some frequency positions, the sync-raster frequency positions and the CRB frequency positions may overlap, the UE may detect the RRM-SSB before detecting the CD-SSB. In this case, if the UE is directly notified of a frequency position of the next sync-raster with CD-SSB through RRM-SSB, it will greatly reduce the time for the UE to search for the CD-SSB at the sync-raster frequency positions one by one. However, currently, no relevant solution has yet been proposed on how to use a non-cell-defining SSB to notify the UE of a sync-raster frequency position where a next cell-defining SSB is located.

SUMMARY

The present disclosure is to provide an information indicating method, an information determining method, a terminal and a base station, so as to solve the current problem that no relevant solution has yet been proposed on how to use a non-cell-defining SSB to notify a UE of a sync-raster frequency position where a next cell-defining SSB is located.

In order to achieve the above objective, the present disclosure provides an information indicating method, which is applied to a base station and includes:

indicating, by using a predetermined parameter of a physical broadcast channel (PBCH) in a first system synchronization block (SSB), whether the first SSB includes associated remaining minimum system information (RMSI); or indicating, by using a predetermined parameter of a physical broadcast channel (PBCH) in a first system synchronization block (SSB), that the first SSB does not include associated remaining minimum system information (RMSI), and indicating frequency offset information of a synchronization raster where a second SSB is located, where the second SSB is an SSB with the associated RMSI.

The indicating, by using the predetermined parameter of the physical broadcast channel (PBCH) in the first system synchronization block (SSB), whether the first SSB includes the associated remaining minimum system information (RMSI) includes: indicating whether the first SSB includes the associated RMSI by using a value of a physical resource block (PRB) grid offsets (PRB-grid-offsets) parameter.

The indicating, by using the predetermined parameter of the physical broadcast channel (PBCH) in the first system synchronization block (SSB), that the first SSB does not include the associated remaining minimum system information (RMSI) and indicating the frequency offset information of the synchronization raster where the second SSB is located includes: indicating that the first SSB does not include the associated RMSI by using a value of a physical resource block (PRB) grid offset (PRB-grid-offset) parameter; and indicating the frequency offset information of the synchronization raster where the second SSB is located, by using an RMSI physical downlink control channel configuration (RMSI-PDCCH-Config) parameter.

The indicating whether the first SSB includes the associated RMSI by using the value of the physical resource block grid offsets (PRB-grid-offsets) parameter includes:

indicating that the first SSB does not include the associated RMSI, in a case that a new radio (NR) band where the base station operates is lower than a predetermined frequency threshold, and g is greater than a first predetermined threshold; or indicating that the first SSB does not include the associated RMSI, in a case that a new radio (NR) band where the base station operates is higher than a predetermined frequency threshold, and g is greater than a second predetermined threshold, where g is the value of the PRB-grid-offsets parameter.

The frequency offset information of the synchronization raster where the second SSB is located includes information of a frequency offset of the synchronization raster in an NR band where the base station operates.

The indicating, by using the predetermined parameter of the physical broadcast channel (PBCH) in the first system synchronization block (SSB), the frequency offset information of the synchronization raster where the second SSB is located includes:

indicating a difference d between an index of the synchronization raster where the second SSB is located and an index of a current synchronization raster, by the following formula:

$$d = \begin{cases} \dfrac{n}{2}, & n \text{ is an even number} \\ -\dfrac{n-1}{2}, & n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

In order to achieve the above objective, embodiments of the present disclosure further provide an information determining method, which is applied to a terminal and includes:

determining, by using a predetermined parameter of a physical broadcast channel (PBCH) in a first system synchronization block (SSB), whether the first SSB includes associated remaining minimum system information (RMSI); or determining, by using a predetermined parameter of a physical broadcast channel (PBCH) in a first system synchronization block (SSB), that the first SSB does not include associated remaining minimum system information (RMSI), and determining frequency offset information of a synchronization raster where a second SSB is located, where the second SSB is an SSB with the associated RMSI.

The determining, by using the predetermined parameter of the physical broadcast channel (PBCH) in the first system synchronization block (SSB), whether the first SSB includes the associated remaining minimum system information (RMSI) includes: determining whether the first SSB includes the associated RMSI by using a value of a physical resource block grid offsets (PRB-grid-offsets) parameter.

The determining, by using the predetermined parameter of the physical broadcast channel (PBCH) in the first system synchronization block (SSB), that the first SSB does not include the associated remaining minimum system information (RMSI), and the frequency offset information of the synchronization raster where the second SSB is located includes: determining that the first SSB does not include the associated RMSI by using a value of a physical resource block grid offsets (PRB-grid-offsets) parameter; and determining the frequency offset information of the synchronization raster where the second SSB is located, by using an RMSI physical downlink control channel configuration (RMSI-PDCCH-Config) parameter.

The determining whether the first SSB includes the associated RMSI by using the value of the physical resource block grid offsets (PRB-grid-offsets) parameter includes:

determining that the first SSB does not include the associated RMSI, in a case that a new radio (NR) band where the base station operates is lower than a predetermined frequency threshold, and g is greater than a first predetermined threshold; or determining that the first SSB does not include the associated RMSI, in a case that a new radio (NR) band where the base station operates is higher than a predetermined frequency threshold, and g is greater than a second predetermined threshold, where g is the value of the PRB-grid-offsets parameter.

The frequency offset information of the synchronization raster where the second SSB is located includes information of a frequency offset of the synchronization raster in an NR band where the base station operates.

The determining, by using the predetermined parameter of the physical broadcast channel (PBCH) in the first system synchronization block (SSB), the frequency offset information of the synchronization raster where the second SSB is located includes:

determining a difference d between an index of the synchronization raster where the second SSB is located and an index of a current synchronization raster, by the following formula:

$$d = \begin{cases} \dfrac{n}{2}, & n \text{ is an even number} \\ -\dfrac{n-1}{2}, & n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

In order to achieve the above objective, embodiments of the present disclosure further provide a base station, which includes: a transceiver, a memory, a processor, and a program that is stored on the memory and executable on the processor. When executing the program, the processor is further configured to:

indicate, by using a predetermined parameter of a physical broadcast channel (PBCH) in a first system synchronization block (SSB), whether the first SSB includes associated remaining minimum system information (RMSI); or indicate, by using a predetermined parameter of a physical broadcast channel (PBCH) in a first system synchronization block (SSB), that the first SSB does not include associated remaining minimum system information (RMSI), and indicate frequency offset information of a synchronization raster where a second SSB is located, where the second SSB is an SSB with the associated RMSI.

When executing the program, the processor is further configured to: indicate whether the first SSB includes the associated RMSI by using a value of a physical resource block grid offsets (PRB-grid-offsets) parameter.

When executing the program, the processor is further configured to: indicate that the first SSB does not include the associated RMSI by using a value of a physical resource block grid offsets (PRB-grid-offsets) parameter; and indicate the frequency offset information of the synchronization raster where the second SSB is located, by using an RMSI physical downlink control channel configuration (RMSI-PDCCH-Config) parameter.

When executing the program, the processor is further configured to:

indicate that the first SSB does not include the associated RMSI, in a case that a new radio (NR) band where the base station operates is lower than a predetermined frequency threshold, and g is greater than a first predetermined threshold; or indicate that the first SSB does not include the associated RMSI, in a case that a new radio (NR) band where the base station operates is higher than a predetermined frequency threshold, and g is greater than a second predetermined threshold, where g is the value of the PRB-grid-offsets parameter.

The frequency offset information of the synchronization raster where the second SSB is located includes information of a frequency offset of the synchronization raster in an NR band where the base station operates.

When executing the program, the processor is further configured to:

indicate a difference d between an index of the synchronization raster where the second SSB is located and an index of a current synchronization raster, by the following formula:

$$d = \begin{cases} \frac{n}{2}, n \text{ is an even number} \\ -\frac{n-1}{2}, n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

In order to achieve the above objective, embodiments of the present disclosure further provide a computer-readable storage medium, on which a program is stored. The program is executed by a processor to implement steps of the information indicating method as described above In order to achieve the above objective, embodiments of the present disclosure further provide a terminal, which includes: a transceiver, a memory, a processor, and a program stored on the memory and executable on the processor. When executing the program, the processor is configured to:

determine, by using a predetermined parameter of a physical broadcast channel (PBCH) in a first system synchronization block (SSB), whether the first SSB includes associated remaining minimum system information (RMSI); or determine, by using a predetermined parameter of a physical broadcast channel (PBCH) in a first system synchronization block (SSB), that the first SSB does not include associated remaining minimum system information (RMSI), and determine frequency offset information of a synchronization raster where a second SSB is located, where the second SSB is an SSB with the associated RMSI.

When executing the program, the processor is further configured to: determine whether the first SSB includes the associated RMSI by using a value of a physical resource block grid offsets (PRB-grid-offsets) parameter.

When executing the program, the processor is further configured to: determine that the first SSB does not include the associated RMSI by using a value of a physical resource block grid offsets (PRB-grid-offsets) parameter; and determine the frequency offset information of the synchronization raster where the second SSB is located, by using an RMSI physical downlink control channel configuration (RMSI-PDCCH-Config) parameter.

When executing the program, the processor is further configured to:

determine that the first SSB does not include the associated RMSI, in a case that a new radio (NR) band where the base station operates is lower than a predetermined frequency threshold, and g is greater than a first predetermined threshold; or determine that the first SSB does not include the associated RMSI, in a case that a new radio (NR) band where the base station operates is higher than a predetermined frequency threshold, and g is greater than a second predetermined threshold, where g is the value of the PRB-grid-offsets parameter.

The frequency offset information of the synchronization raster where the second SSB is located includes information of a frequency offset of the synchronization raster in an NR band where the base station operates.

When executing the program, the processor is further configured to:

determining a difference d between an index of the synchronization raster where the second SSB is located and an index of a current synchronization raster, by the following formula:

$$d = \begin{cases} \frac{n}{2}, n \text{ is an even number} \\ -\frac{n-1}{2}, n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

In order to achieve the above objective, embodiments of the present disclosure further provide a computer-readable storage medium, on which a program is stored. The program is executed by a processor to implement steps of the information determining method as described above.

In order to achieve the above objective, embodiments of the present disclosure further provide a base station, which includes an indication module configured to:

indicate, by using a predetermined parameter of a physical broadcast channel (PBCH) in a first system synchronization block (SSB), whether the first SSB includes associated remaining minimum system information (RMSI); or indicate, by using a predetermined parameter of a physical broadcast channel (PBCH) in a first system synchronization block (SSB), that the first SSB does not include associated remaining minimum system information (RMSI), and indicate frequency offset information of a synchronization raster where a second SSB is located, where the second SSB is an SSB with the associated RMSI.

In order to achieve the above objective, embodiments of the present disclosure further provide a terminal, which includes a determination module configured to:

determine, by using a predetermined parameter of a physical broadcast channel (PBCH) in a first system synchronization block (SSB), whether the first SSB includes associated remaining minimum system information (RMSI); or determine, by using a predetermined parameter of a physical broadcast channel (PBCH) in a first system synchronization block (SSB), that the first SSB does not include associated remaining minimum system information (RMSI), and determine frequency offset information of a synchronization raster where a second SSB is located, where the second SSB is an SSB with the associated RMSI.

The embodiments of the present disclosure have the following beneficial effects.

In the above technical solutions of the embodiments of the present disclosure, by using a predetermined parameter of a PBCH in an SSB to indicate that the SSB does not carry associated RMSI and information about a frequency offset of a synchronization raster where a next SSB carrying the associated RMSI is located, relative to a current synchronization raster, a terminal can quickly obtain the RMSI of a cell to be accessed according to the predetermined parameter, thereby achieving the objective of using a non-cell-defining SSB to notify the UE of a sync-raster frequency position where a next cell-defining SSB is located.

DETAILED DESCRIPTION

In order to make technical problems to be solved, technical solutions and advantages of the present disclosure clearer, specific embodiments will be detailly described below in conjunction with drawings.

Figure 1:
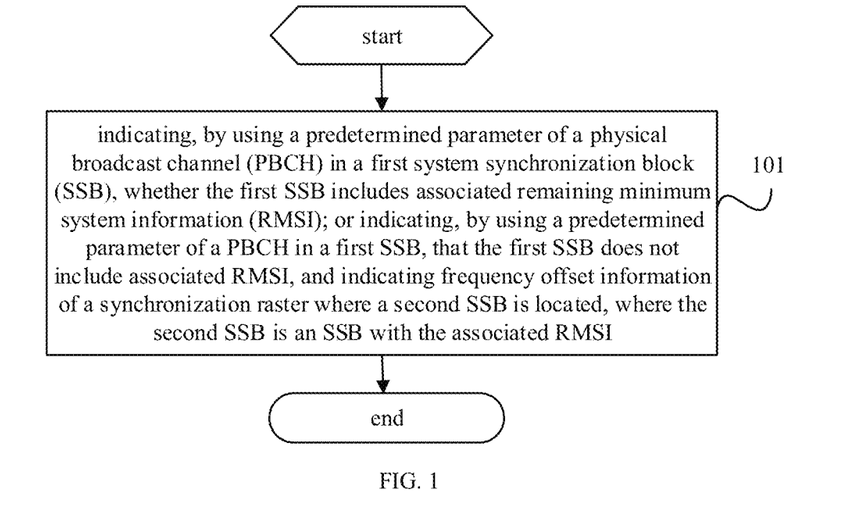
FIG. 1 is a flowchart of an information indicating method according to embodiments of the present disclosure.

As shown in FIG. 1, an information indicating method is provided according to embodiments of the present disclosure, which is applied to a base station and includes step 101: indicating, by using a predetermined parameter of a physical broadcast channel (PBCH) in a first system synchronization block (SSB), whether the first SSB includes associated remaining minimum system information (RMSI); or indicating, by using a predetermined parameter of a physical broadcast channel (PBCH) in a first system synchronization block (SSB), that the first SSB does not include associated remaining minimum system information (RMSI), and indicating frequency offset information of a synchronization raster where a second SSB is located, where the second SSB is an SSB with the associated RMSI.

Whether the first SSB includes the associated RMSI or not may be indicated according to the value of the predetermined parameter of the PBCH in the first SSB.

In a case that the value of the predetermined parameter of the PBCH in the first SSB indicates that the first SSB carries the associated RMSI, it means that the first SSB is a CD-SSB.

It should be noted that when using the predetermined parameter of the PBCH in the first SSB to indicate that the first SSB does not include associated RMSI, and to indicate the frequency offset information of the synchronization raster where the second SSB is located, the following two cases are considered in the embodiments:

(i) since an SSB transmission periodicity configured by the base station (BS) is shorter than an RMSI transmission period, the BS transmits the RRM-SSB at a same sync-raster frequency position as the CD-SSB; and (ii) the BS transmits the RRM-SSB at a certain CRB frequency position, and the CRB frequency position is also at the sync-raster frequency position.

For the first case, the network needs to notify, through the predetermined parameter of the PBCH in the RRM-SSB, a user equipment (UE) of that the detected SSB is an RRM-SSB without carrying the RMSI, and that a sync-raster frequency position of the CD-SSB is the same as that of the detected RRM-SSB. That is, a frequency offset of a next sync-raster with CD-SSB relative to the current sync-raster is zero.

For the second case, the network needs to notify the UE, through the predetermined parameter of the PBCH in the RRM-SSB, of that the detected SSB is an RRM-SSB. At the same time, the network needs to further inform the UE of a frequency offset of a next sync-raster with CD-SSB relative to the current sync-raster.

In the information indicating method according to the embodiments of the present disclosure, by using a predetermined parameter of a PBCH in an SSB to indicate that the SSB does not carry associated RMSI and information about a frequency offset of a synchronization raster where a next SSB carrying the associated RMSI is located, relative to a current synchronization raster, a terminal can quickly obtain the RMSI of a cell to be accessed according to the predetermined parameter, thereby achieving the objective of using a non-cell-defining SSB to notify the UE of a sync-raster frequency position where a next cell-defining SSB is located.

As an optional implementation, the above step 101 includes step 1011: indicating whether the first SSB includes the associated RMSI by using a value of a physical resource block grid offsets (PRB-grid-offsets) parameter.

In a case that the value of the PRB-grid-offsets parameter indicates that the first SSB includes the associated RMSI, it indicates that the first SSB is a CD-SSB, and the UE may directly obtain the RMSI of the cell to be accessed. The PRB-grid-offset in the embodiments of the present disclosure may also be referred to as a synchronous subcarrier offset (ssb-subcarrier-offset) in the PBCH.

It should be noted that when a carrier frequency is lower than 6 GHz, there are 24 possible values for a subcarrier offset between the boundary of the SSB PRB with the associated RMSI and an RMSI PRB. 5 bits of PRB-grid-offsets are used in NR to indicate possible subcarrier offset values. Since 5 bits can indicate 32 possible values, in addition to indicating the above 24 possible values, the remaining 8 possible values may be used to indicate that the SSB does not include the associated RMSI.

When a carrier frequency is higher than 6 GHz, there are 12 possible values for a subcarrier offset between the boundary of the SSB PRB with the associated RMSI and an RMSI PRB. 4 bits PRB-grid-offsets are used in NR to indicate possible subcarrier offset values. Since 4 bits can indicate 16 possible values, in addition to indicating the above 12 possible values, the remaining 4 possible values may be used to indicate that the SSB does not include the associated RMSI.

Therefore, optionally, step 1011 may further specifically include:

step 10111, indicating that the first SSB does not include the associated RMSI, in a case that a new radio (NR) band where the base station operates is lower than a predetermined frequency threshold, and g is greater than a first predetermined threshold; or step 10112, indicating that the first SSB does not include the associated RMSI, in a case that a new radio (NR) band where the base station operates is higher than a predetermined frequency threshold, and g is greater than a second predetermined threshold, where g represents the value of the PRB-grid-offsets parameter.

The predetermined frequency threshold in the embodiments of the present disclosure may be specifically 6 GHz, the first predetermined threshold may be specifically 23, and the second predetermined threshold may be specifically 11.

Step 10111 and step 10112 are two parallel execution steps.

As another optional implementation, the foregoing step 101 may further include step 1012: indicating that the first SSB does not include the associated RMSI by using a value of a physical resource block grid offsets (PRB-grid-offsets) parameter; and indicating the frequency offset information of the synchronization raster where the second SSB is located, by using an RMSI physical downlink control channel configuration (RMSI-PDCCH-Config) parameter.

It should be noted that, in addition to using the RMSI-PDCCH-Config parameter in the PBCH, other parameters in the PBCH can also be used to indicate the frequency offset information of the synchronization raster where the second SSB is located.

It is mentioned in the above step 1011 that when the carrier frequency is lower than 6 GHz, 5 bits of PRB-grid-offsets are used in NR to indicate possible subcarrier offset values. The remaining 8 possible values can be used to indicate that the SSB does not include associated RMSI, which can also be used with the RMSI-PDCCH-Config (8 bits) to indicate frequency offsets of sync-rasters. The maximum number of sync-raster frequency offset positions that can be indicated is $8*2^8=8*256=2048$.

When the carrier frequency is higher than 6 GHz, 4 bits of PRB-grid-offsets are used in NR to indicate possible subcarrier offset values. The remaining 4 possible values can be used to indicate that the SSB does not include associated RMSI, which can also be used with the RMSI-PDCCH-Config (8 bits) to indicate the frequency offsets of sync-rasters. The maximum number of sync-raster frequency offset positions that can be indicated is $4*2^8=4*256=1024$.

The sync-raster is defined by NR in three frequency ranges: 0 GHz to 2.65 GHz, 2.4 GHz to 24.25 GHz, and 24.25 GHz to 100 GHz, and a frequency band is not defined in NR in the frequency range of 6 GHz to 24.25 GHz. Therefore, it is actually only necessary to consider how to indicate a frequency offset of the current sync-raster to the next sync-raster with CD-SSB, by using the parameter of PBCH in RRM-SSB, i.e., the RMSI-PDCCH-Config parameter.

In addition, the total numbers of sync-rasters in the three respective frequency ranges of 0 GHz to 2.65 GHz, 2.4 GHz to 24.25 GHz, and 24.25 GHz to 100 GHz are: 8832, 15174, and 4384. It is impossible to use the parameter of the PBCH in the RRM-SSB to indicate all the sync-rasters in the frequency ranges of 0 GHz to 2.65 GHz, 2.4 GHz to 6 GHz, and 24.25 GHz to 100 GHz, due to the limitation of a range of a frequency offset of the current sync-raster to the next sync-raster with CD-SSB, which is indicated by the parameter of the PBCH in the RRM-SSB. That is, when a carrier frequency is lower than 6 GHz, the maximum number of sync-raster frequency offset positions can be indicated is limited to $8*256=2048$. When a carrier frequency is higher than 6 GHz, the maximum number of sync-raster frequency offset positions that can be indicated is limited to $4*256=1024$.

The maximum bandwidths of the NR band are 90 MHz, 900 MHz and 3.25 GHz, respectively in the frequency ranges of 0 GHz to 2.65 GHz, 2.4 GHz to 6 GHz, and 24.25 GHz to 100 GHz. Therefore, in the embodiments, the parameters of the PBCH in the SSB are used to indicate frequency offset positions of the sync-rasters within the bandwidths of the respective frequency ranges.

Specifically, according to the maximum bandwidths of the NR band within the frequency ranges of 0 GHz to 2.65 GHz, 2.4 GHz to 6 GHz, and 24.25 GHz to 100 GHz, and the sync-rasters is defined by the NR in the three frequency ranges of 0 GHz to 2.65 GHz, 2.4 GHz to 6 GHz, and 24.25 GHz to 100 GHz, the maximum number of sync-raster positions in the NR band within each of the frequency ranges, which is detailed as follows:

in the frequency range 0 GHz to 2.65 GHz, the maximum number of sync-raster positions is $$\frac{90 \text{ MHz}}{900 \text{ kHz}} * 3 = 300;$$

in the frequency range 2.4 GHz to 6 GHz, the maximum number of sync-raster positions is $$\frac{900 \text{ MHz}}{1.44 \text{ MHz}} / 3 = 208;$$

and in the frequency range 24.25 GHz to 100 GHz, the maximum number of sync-raster positions is $$\frac{3.25 \text{ GHz}}{17.28 \text{ MHz}} = 188.$$

Therefore, in an embodiment, optionally, the frequency offset information of the synchronization raster where the second SSB is located is information of a frequency offset of the synchronization raster in an NR band where the base station operates.

On this basis, as an optional implementation, in step 101, the indicating, by using the predetermined parameter of the PBCH in the first SSB, the frequency offset information of the synchronization raster where the second SSB is located includes:

indicating a difference d between an index of a synchronization raster where the second SSB is located and an index of a current synchronization raster, by the following formula:

$$d = \begin{cases} \dfrac{n}{2}, & n \text{ is an even number} \\ -\dfrac{n-1}{2}, & n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

This embodiment can be applied to the following three application scenarios:

a) indicating the frequency offset position of the next sync-raster with CD-SSB according to three different frequency ranges, in a case that the frequency range is 0 GHz to 2.65 GHz, the number of sync-raster positions that need to be indicated is N=300;

in a case that the frequency range is 2.4 GHz to 6 GHz, the number of sync-raster positions that need to be indicated is N=208; and in a case that the frequency range is 24.25 GHz to 100 GHz, the number of sync-raster positions that need to be indicated is N=188, b) indicating the frequency offset position of the next sync-raster with CD-SSB according to two different frequency ranges, in a case that the frequency range is below 6 GHz, the number of sync-raster positions that need to be indicated is N=300; and in a case that the frequency range is above 6 GHz, the number of sync-raster positions that need to be indicated is N=188, c) indicating the frequency offset position of the next sync-raster with CD-SSB does not depend on the frequency ranges, and the number of sync-raster positions that need to be indicated is N=300.

Specifically, in a case that the number of sync-raster positions in a certain frequency range is N, a range of possible values of the next sync-raster is [−N+1, N−1]. N herein is not limited to the number of sync-raster positions that need to be indicated in the above application scenarios.

Optionally, c1 is 256; and c2 is 512. Specific implementations are shown in Table 1.

TABLE 1

| Value (g) of PRB-grid-offsets parameter | Value (g) of RMSI-PDCCH-Config parameter | Annotation |
| --- | --- | --- |
| Frequency range is below 6 GHz, and g = 24; or Frequency range is above 6 GHz, and g = 12 | n = m | If m = 0, the frequency offset is 0 |
| Frequency range is below 6 GHz, and g = 25; or Frequency range is above 6 GHz, and g = 13 | n = m + 256 | if 256 ≤ 2N |
| Frequency range is below 6 GHz, and g = 26 | n = m + 512 | if 512 ≤ 2N |

Location offset value of a sync-raster with CD-SSB, as indicated:

$$d = \begin{cases} \dfrac{n}{2}, & n \text{ is an even number} \\ -\dfrac{n-1}{2}, & n \text{ is an odd number} \end{cases}$$

n ≤ 2N − 1

It should be noted that in the above table, when each frequency in the frequency range is lower than 6 GHz, there are 8 remaining values {24, 25, . . . , 31} available in the PRB grid offset parameter. When each frequency in the frequency range is higher than 6 GHz, there are 4 remaining values {12, 13, 14, 15} available in the PRB grid offset parameter. The remaining values in the PRB grid offset parameter used in Table 1 can be replaced with other values.

In the information indicating method according to the embodiments of the present disclosure, by using a predetermined parameter of a PBCH in a CD-SSB to indicate that the SSB does not carry associated RMSI and information about a frequency offset of a synchronization raster where a next SSB carrying the associated RMSI is located, relative to the current synchronization raster, a terminal can quickly obtain the RMSI of a cell to be accessed according to the predetermined parameter, thereby achieving the objective of using a non-cell-defining SSB to notify the UE of a sync-raster frequency position where a next cell-defining SSB is located.

Figure 2:
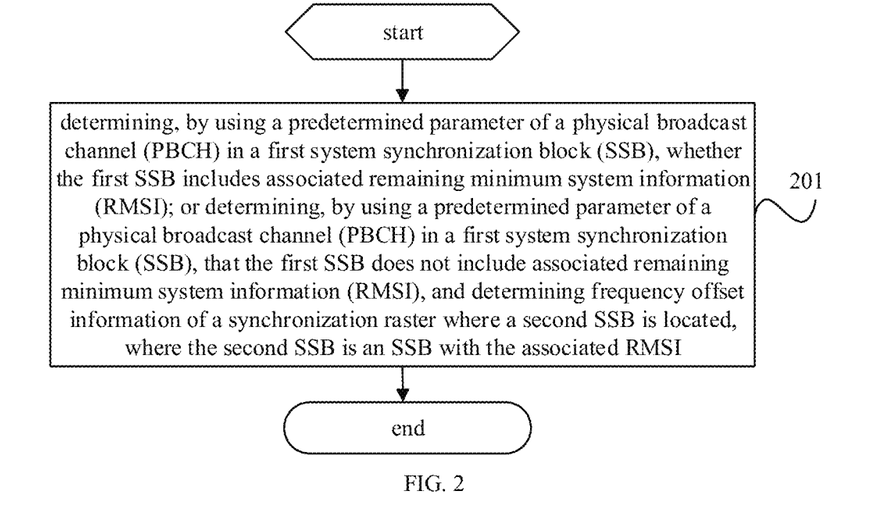
FIG. 2 is a flowchart of an information determining method according to embodiments of the present disclosure.

As shown in FIG. 2, embodiments of the present disclosure further provide an information determining method, which is applied to a terminal. The determination method includes step 201: determining, by using a predetermined parameter of a physical broadcast channel (PBCH) in a first system synchronization block (SSB), whether the first SSB includes associated remaining minimum system information (RMSI); or determining, by using a predetermined parameter of a physical broadcast channel (PBCH) in a first system synchronization block (SSB), that the first SSB does not include associated remaining minimum system information (RMSI), and determining frequency offset information of a synchronization raster where a second SSB is located, where the second SSB is an SSB with the associated RMSI.

As an optional implementation, the above step 201 includes step 2011: determining whether the first SSB includes the associated RMSI by using a value of a physical resource block grid offsets (PRB-grid-offsets) parameter.

Optionally, step 2011 may further specifically include:

step 20111, determining that the first SSB does not include the associated RMSI, in a case that a new radio (NR) band where the base station operates is lower than a predetermined frequency threshold, and g is greater than a first predetermined threshold; or step 20112, determining that the first SSB does not include the associated RMSI, in a case that a new radio (NR) band where the base station operates is higher than a predetermined frequency threshold, and g is greater than a second predetermined threshold, where g is the value of the PRB-grid-offsets parameter.

Step 20111 and step 20112 are two parallel execution steps.

As another optional implementation, the foregoing step 201 may further include: determining that the first SSB does not include the associated RMSI by using a value of a physical resource block grid offsets (PRB-grid-offsets) parameter; and determining the frequency offset information of the synchronization raster where the second SSB is located, by using an RMSI physical downlink control channel configuration (RMSI-PDCCH-Config) parameter.

A PRB grid offset in embodiments of the present disclosure may also be referred to as a synchronous subcarrier offset (ssb-subcarrier-offset) in the PBCH.

It should be noted that, in addition to using the RMSI-PDCCH-Config parameter in the PBCH, other parameters in the PBCH can also be used to determine the frequency offset information of the synchronization raster where the second SSB is located.

In addition, it can be known from the foregoing descriptions that the parameters of the PBCH in the SSB are used to indicate frequency offset positions of sync-rasters in a bandwidth of a frequency band within the respective frequency ranges. Therefore, in this embodiment, optionally, the frequency offset information of the synchronization raster where the second SSB is located is information of a frequency offset of the synchronization raster in an NR band where the base station operates.

On this basis, as an optional implementation, in step 201, the determining, by using the predetermined parameter of the physical broadcast channel (PBCH) in the first system synchronization block (SSB), the frequency offset information of the synchronization raster where the second SSB is located includes:

determining a difference d between an index of the synchronization raster where the second SSB is located and an index of a current synchronization raster, by the following formula:

$$d = \begin{cases} \frac{n}{2}, & n \text{ is an even number} \\ -\frac{n-1}{2}, & n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

This formula has been described in detail in the method embodiments on the base station side, and will not be repeated herein.

Based on the information determining method according to the embodiments of the present disclosure, by using predetermined parameters of PBCH in a first SSB to determine whether the first SSB includes associated RMSI, or to determine that the first SSB does not include the associated RMSI and frequency offset information of a synchronization raster where a second SSB is located, the objective of using a non-cell-defining SSB to notify the UE of a sync-raster frequency position where a next cell-defining SSB is located is achieved.

Figure 3:
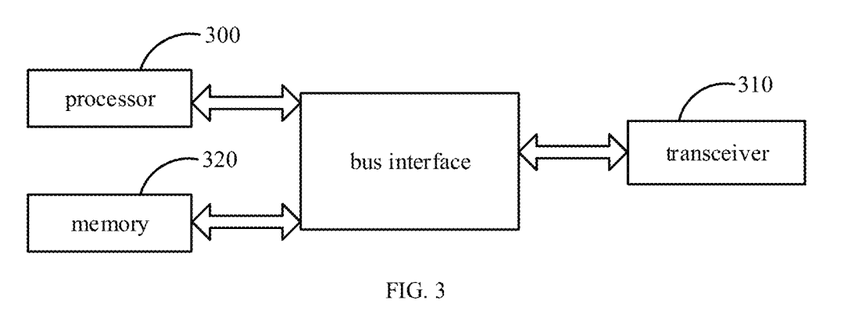
FIG. 3 is a structural block diagram of a base station according to embodiments of the present disclosure.

As shown in FIG. 3, embodiments of the present disclosure further provide a base station, which includes: a transceiver, a memory, a processor, and a computer program stored on the memory and executable on the processor. When executing the computer program, the processor is configured to implement the following steps:

indicating, by using a predetermined parameter of a physical broadcast channel (PBCH) in a first system synchronization block (SSB), whether the first SSB includes associated remaining minimum system information (RMSI); or indicating, by using a predetermined parameter of a physical broadcast channel (PBCH) in a first system synchronization block (SSB), that the first SSB does not include associated remaining minimum system information (RMSI), and indicating frequency offset information of a synchronization raster where a second SSB is located, where the second SSB is an SSB with the associated RMSI.

In FIG. 3, the bus architecture may include any number of interconnected buses and bridges, specifically one or more processors represented by the processor 300 and various circuits of the memory represented by the memory 320 are linked together. The bus architecture can also link various other circuits such as peripheral devices, voltage regulators, and power management circuits, etc., which are well known in the art, and therefore, will not be further described in the present specification. The bus interface provides an interface. The transceiver 310 may be a plurality of elements, including a transmitter and a receiver, and provides a unit for communicating with various other devices on a transmission medium. The processor 300 is responsible for managing the bus architecture and general processing, and the memory 320 may store data used by the processor 300 when performing operations.

The processor 300 is responsible for managing the bus architecture and general processing, and the memory 320 may store data used by the processor 300 when performing operations.

The processor 300 is further configured to read the program in the memory 320 to indicate whether the first SSB includes the associated RMSI by using a value of a physical resource block grid offsets (PRB-grid-offsets) parameter.

The processor 300 is further configured to read the program in the memory 320 to indicate that the first SSB does not include the associated RMSI by using a value of a physical resource block grid offsets (PRB-grid-offsets) parameter; and indicate the frequency offset information of the synchronization raster where the second SSB is located, by using an RMSI physical downlink control channel configuration (RMSI-PDCCH-Config) parameter.

The processor 300 is further configured to read the program in the memory 320 to:

indicate that the first SSB does not include the associated RMSI, in a case that a new radio (NR) band where the base station operates is lower than a predetermined frequency threshold, and g is greater than a first predetermined threshold; or indicate that the first SSB does not include the associated RMSI, in a case that a new radio (NR) band where the base station operates is higher than a predetermined frequency threshold, and g is greater than a second predetermined threshold, where g represents the value of the PRB-grid-offsets parameter.

The frequency offset information of the synchronization raster where the second SSB is located includes information of a frequency offset of the synchronization raster in an NR band where the base station operates.

The processor 300 is further configured to read the program in the memory 320 to:

indicate a difference d between an index of the synchronization raster where a second SSB is located and an index of a current synchronization raster, by a following formula:

$$d = \begin{cases} \frac{n}{2}, & n \text{ is an even number} \\ -\frac{n-1}{2}, & n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

In some embodiments of the present disclosure, a computer-readable storage medium is further provided, on which a computer program is stored. The program is executed by the processor to implement the following steps:

indicating, by using a predetermined parameter of a physical broadcast channel (PBCH) in a first system synchronization block (SSB), whether the first SSB includes associated remaining minimum system information (RMSI); or indicating, by using a predetermined parameter of a physical broadcast channel (PBCH) in a first system synchronization block (SSB), that the first SSB does not include associated remaining minimum system information (RMSI), and indicating frequency offset information of a synchronization raster where a second SSB is located, where the second SSB is an SSB with the associated RMSI.

When the program is executed by the processor, all the implementations in the embodiments of the information indicating method applied to the terminal side as described above can be implemented. To avoid repetition, details are not described herein again.

Figure 4:
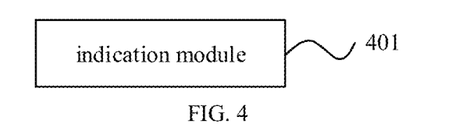
FIG. 4 is a schematic modular diagram of a base station according to embodiments of the present disclosure.

As shown in FIG. 4, embodiments of the present disclosure further provide a base station, which includes an indication module 401 configured to:

indicate, by using a predetermined parameter of a physical broadcast channel (PBCH) in a first system synchronization block (SSB), whether the first SSB includes associated remaining minimum system information (RMSI); or indicate, by using a predetermined parameter of a physical broadcast channel (PBCH) in a first system synchronization block (SSB), that the first SSB does not include associated remaining minimum system information (RMSI), and indicate frequency offset information of a synchronization raster where a second SSB is located, where the second SSB is an SSB with the associated RMSI.

In the base station according to an embodiment of the present disclosure, the indication module 401 is configured to indicate whether the first SSB includes the associated RMSI by using a value of a physical resource block grid offsets (PRB-grid-offsets) parameter.

In the base station according to an embodiment of the present disclosure, the indication module 401 is configured to indicate the first SSB does not include the associated RMSI by using a value of a physical resource block grid offsets (PRB-grid-offsets) parameter; and indicate the frequency offset information of the synchronization raster where the second SSB is located, by using an RMSI physical downlink control channel configuration (RMSI-PDCCH-Config) parameter.

In the base station according to an embodiment of the present disclosure, the indication module 401 is configured to:

indicate that the first SSB does not include the associated RMSI, in a case that a new radio (NR) band where the base station operates is lower than a predetermined frequency threshold, and g is greater than a first predetermined threshold; or indicate that the first SSB does not include the associated RMSI, in a case that a new radio (NR) band where the base station operates is higher than a predetermined frequency threshold, and g is greater than a second predetermined threshold, where g represents the value of the PRB-grid-offsets parameter.

In the base station according to an embodiment of the present disclosure, the frequency offset information of the synchronization raster where the second SSB is located includes information of a frequency offset of the synchronization raster in an NR band where the base station operates.

In the base station according to an embodiment of the present disclosure, the indication module 401 is configured to indicate a difference d between an index of the synchronization raster where a second SSB is located and an index of a current synchronization raster, by a following formula:

$$d = \begin{cases} \frac{n}{2}, & n \text{ is an even number} \\ -\frac{n-1}{2}, & n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

According to the embodiments of the present disclosure, the base station indicates that the SSB does not carry associated RMSI and information about a frequency offset of a synchronization raster where a next SSB carrying the associated RMSI is located, with respect to a current synchronization raster, by using a predetermined parameter of a PBCH in an SSB, such that a terminal can quickly obtain the RMSI of a cell to be accessed according to the predetermined parameter, Therefore, the objective of using a non-cell-defining SSB to notify the UE of a sync-raster frequency position where a next cell-defining SSB is located is achieved.

Figure 5:
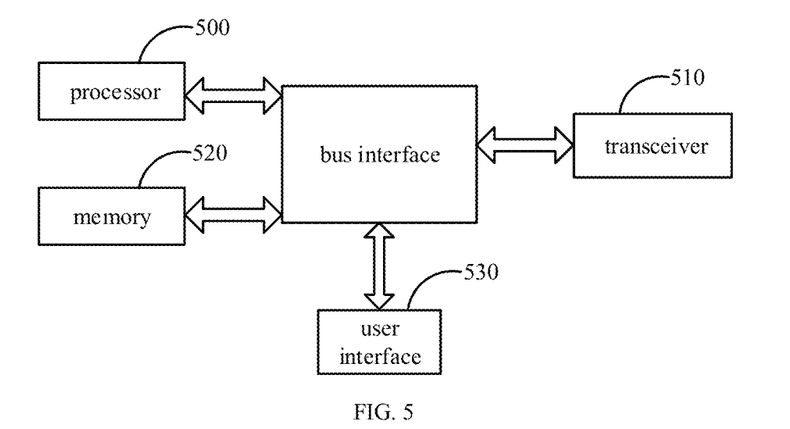
FIG. 5 is a structural block diagram of a terminal according to embodiments of the present disclosure.

As shown in FIG. 5, embodiments of the present disclosure further provide a terminal, including: a transceiver, a memory, a processor, and a program stored on the memory and executable on the processor. When executing the computer program, the processor is configured to implement the following steps:

determining, by using a predetermined parameter of a physical broadcast channel (PBCH) in a first system synchronization block (SSB), whether the first SSB includes associated remaining minimum system information (RMSI); or determining, by using a predetermined parameter of a physical broadcast channel (PBCH) in a first system synchronization block (SSB), that the first SSB does not include associated remaining minimum system information (RMSI), and determining frequency offset information of a synchronization raster where a second SSB is located, where the second SSB is an SSB with the associated RMSI.

In FIG. 5, the bus architecture may include any number of interconnected buses and bridges. Specifically, one or more processors represented by the processor 500 and various circuits of the memory represented by the memory 520 are linked together. The bus architecture can also link various other circuits such as peripheral devices, voltage regulators, and power management circuits, etc., which are well known in the art, and therefore, will not be further described in the present specification. The bus interface provides an interface. The transceiver 510 may include a plurality of elements, including a transmitter and a receiver, and provides a unit for communicating with various other devices on a transmission medium. For different user devices, the user interface 530 may also be an interface that can be externally connected to the required device. The connected devices include, but are not limited to, a keypad, a display, a speaker, a microphone, and a joystick.

The processor 500 is responsible for managing the bus architecture and general processing, and the memory 520 may store data used by the processor 500 when performing operations.

The processor 500 is further configured to read the program in the memory 520 and perform the following steps: determining whether the first SSB includes the associated RMSI by using a value of a physical resource block grid offsets (PRB-grid-offsets) parameter.

The processor 500 is further configured to read the program in the memory 520 and perform the following steps:

determining that the first SSB does not include the associated RMSI by using a value of a physical resource block grid offsets (PRB-grid-offsets) parameter; and determining the frequency offset information of the synchronization raster where the second SSB is located, by using an RMSI physical downlink control channel configuration (RMSI-PDCCH-Config) parameter.

The processor 500 is further configured to read the program in the memory 520 and perform the following steps:

determining that the first SSB does not include the associated RMSI, in a case that a new radio (NR) band where the base station operates is lower than a predetermined frequency threshold, and g is greater than a first predetermined threshold; or determining that the first SSB does not include the associated RMSI, in a case that a new radio (NR) band where the base station operates is higher than a predetermined frequency threshold, and g is greater than a second predetermined threshold, where g is the value of the PRB-grid-offsets parameter.

Optionally, the frequency offset information of the synchronization raster where the second SSB is located includes information of a frequency offset of the synchronization raster in an NR band where the base station operates.

The processor 500 is further configured to read the program in the memory 520 and perform the following steps: determining a difference d between an index of the synchronization raster where the second SSB is located and an index of a current synchronization raster, by the following formula:

$$d = \begin{cases} \dfrac{n}{2}, n \text{ is an even number} \\ -\dfrac{n-1}{2}, n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

In some embodiments of the present disclosure, a computer-readable storage medium is further provided, on which a computer program is stored. The program is executed by a processor to:

determine, by using a predetermined parameter of a physical broadcast channel (PBCH) in a first system synchronization block (SSB), whether the first SSB includes associated remaining minimum system information (RMSI); or determine, by using a predetermined parameter of a physical broadcast channel (PBCH) in a first system synchronization block (SSB), that the first SSB does not include associated remaining minimum system information (RMSI), and determine frequency offset information of a synchronization raster where a second SSB is located, where the second SSB is an SSB with the associated RMSI.

When the program is executed by the processor, all the implementations in the above-mentioned embodiments of the information determining method applied to the terminal side can be implemented, which will not be repeated herein to avoid repetition.

Figure 6:
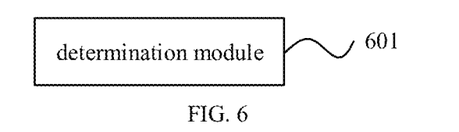
FIG. 6 is a schematic modular diagram of a terminal according to embodiments of the present disclosure.

As shown in FIG. 6, embodiments of the present disclosure further provide a terminal, which includes a determination module 601 configured to:

determine, by using a predetermined parameter of a physical broadcast channel (PBCH) in a first system synchronization block (SSB), whether the first SSB includes associated remaining minimum system information (RMSI); or determine, by using a predetermined parameter of a physical broadcast channel (PBCH) in a first system synchronization block (SSB), that the first SSB does not include associated remaining minimum system information (RMSI), and determine frequency offset information of a synchronization raster where a second SSB is located, where the second SSB is an SSB with the associated RMSI.

In the terminal according to an embodiment of the present disclosure, the determination module is configured to determine whether the first SSB includes the associated RMSI by using a value of a physical resource block grid offsets (PRB-grid-offsets) parameter.

In the terminal according to an embodiment of the present disclosure, the determination module is configured to determine that the first SSB does not include the associated RMSI by using a value of a physical resource block grid offsets (PRB-grid-offsets) parameter; and determining the frequency offset information of the synchronization raster where the second SSB is located, by using an RMSI physical downlink control channel configuration (RMSI-PDCCH-Config) parameter.

In the terminal according to an embodiment of the present disclosure, the determination module is configured to:

determine that the first SSB does not include the associated RMSI, in a case that a new radio (NR) band where the base station operates is lower than a predetermined frequency threshold, and g is greater than a first predetermined threshold; or determine that the first SSB does not include the associated RMSI, in a case that a new radio (NR) band where the base station operates is higher than a predetermined frequency threshold, and g is greater than a second predetermined threshold, where g is the value of the PRB-grid-offsets parameter.

In the terminal according to an embodiment of the present disclosure, the frequency offset information of the synchronization raster where the second SSB is located includes information of a frequency offset of the synchronization raster in an NR band where the base station operates.

In the terminal according to an embodiment of the present disclosure, the determination module is configured to determine a difference d between an index of the synchronization raster where the second SSB is located and an index of a current synchronization raster, by the following formula:

$$d = \begin{cases} \dfrac{n}{2}, n \text{ is an even number} \\ -\dfrac{n-1}{2}, n \text{ is an odd number} \end{cases};$$

where n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, where g represents a value of a PRB-grid-offsets parameter, m represents a value of an RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

According to the embodiments of the present disclosure, the terminal determines whether a first SSB includes associated RMSI, or determines that a first SSB does not carry associated RMSI and information about a frequency offset of a synchronization raster where a next SSB carrying the associated RMSI is located, by using a predetermined parameter of a PBCH in an SSB. Therefore, the objective of using a non-cell-defining SSB to notify the UE of a sync-raster frequency position where a next cell-defining SSB is located is achieved.

In the various embodiments of the present disclosure, it should be understood that the size of sequence numbers of the above processes does not mean the execution order, and the execution order of each process should be determined by its function and inherent logic, and should not constitute any limitation to the implementation processes in the embodiments of the present disclosure.

The above embodiments are optional embodiments of the present disclosure. It should be noted that those of ordinary skill in the art can make several improvements and modifications without departing from the principles of the present disclosure, and these improvements and modifications shall also fall within the protection scope of the present disclosure.

What is claimed is:

1. An information indicating method, applied to a base station, comprising:
    indicating, by using a predetermined parameter of a physical broadcast channel (PBCH) in a first system synchronization block (SSB), whether the first SSB comprises associated remaining minimum system information (RMSI); or
    indicating, by using a predetermined parameter of a physical broadcast channel (PBCH) in a first system synchronization block (SSB), that the first SSB does not comprise associated remaining minimum system information (RMSI), and indicating frequency offset information of a synchronization raster where a second SSB is located, wherein the second SSB is an SSB with the associated RMSI,
    wherein a physical resource block grid offsets (PRB-grid-offsets) parameter has some values to indicate subcarrier offset values, and remaining values to indicate the frequency offset information of the synchronization raster,
    wherein the indicating, by using the predetermined parameter of the PBCH in the first SSB that the first SSB does not comprise the RMSI and indicating the frequency offset information of the synchronization raster where the second SSB is located comprises:
    indicating that the first SSB does not comprise the associated RMSI by using a value of the PRB-grid-offsets parameter that meets a predetermined condition; and
    indicating the frequency offset information of the synchronization raster where the second SSB is located, by using the remaining values of the PRB-grid-offset parameter and an RMSI physical downlink control channel configuration (RMSI-PDCCH-Config) parameter.

2. The information indicating method according to claim 1, wherein the indicating, by using the predetermined parameter of the physical broadcast channel (PBCH) in the first system synchronization block (SSB), whether the first SSB comprises the associated remaining minimum system information (RMSI) comprises:
    indicating whether the first SSB comprises the associated RMSI by using a value of the PRB-grid-offsets parameter.

3. The information indicating method according to claim 2, wherein the indicating whether the first SSB comprises the associated RMSI by using the value of the physical resource block grid offsets (PRB-grid-offsets) parameter comprises:
    indicating that the first SSB does not comprise the associated RMSI, in a case that a new radio (NR) band where the base station operates is lower than a predetermined frequency threshold, and g is greater than a first predetermined threshold; or
    indicating that the first SSB does not comprise the associated RMSI, in a case that a new radio (NR) band where the base station operates is higher than a predetermined frequency threshold, and g is greater than a second predetermined threshold,
    wherein g represents the value of the PRB-grid-offsets parameter.

4. The information indicating method according to claim 1, wherein the frequency offset information of the synchronization raster where the second SSB is located comprises information of a frequency offset of the synchronization raster in an NR band where the base station operates.

5. The information indicating method according to claim 4, wherein the indicating, by using the predetermined parameter of the physical broadcast channel (PBCH) in the first system synchronization block (SSB), the frequency offset information of the synchronization raster where the second SSB is located comprises:
    indicating a difference d between an index of the synchronization raster where the second SSB is located and an index of a current synchronization raster, by a following formula:

$$d = \begin{cases} \dfrac{n}{2}, n \text{ is an even number} \\ -\dfrac{n-1}{2}, n \text{ is an odd number} \end{cases};$$

wherein n=m, in a case that the NR band where the base station operates is lower than a predetermined frequency threshold and g is equal to a first value, or the NR band where the base station operates is higher than a predetermined frequency threshold and g is equal to a second value;
    n=m+c1, in a case that the NR band where the base station operates is lower than the predetermined frequency threshold and g is equal to a third value, or the NR band where the base station operates is higher than the predetermined frequency threshold and g is equal to a fourth value; and
    n=m+c2, in a case that the NR band where the base station operates is lower than the predetermined frequency threshold and g is equal to a fifth value,
    wherein g represents a value of a PRB-grid-offsets parameter, m represents a value of the RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

6. An information determining method, applied to a terminal, comprising:
    determining, by using a predetermined parameter of a physical broadcast channel (PBCH) in a first system synchronization block (SSB), whether the first SSB comprises associated remaining minimum system information (RMSI); or determining, by using a predetermined parameter of a physical broadcast channel (PBCH) in a first system synchronization block (SSB), that the first SSB does not comprise associated remaining minimum system information (RMSI), and determining frequency offset information of a synchronization raster where a second SSB is located, wherein the second SSB is an SSB with the associated RMSI, wherein a physical resource block grid offsets (PRB-grid-offsets) parameter has some values to indicate subcarrier offset values, and remaining values to indicate the frequency offset information of the synchronization raster, wherein the determining, by using the predetermined parameter of the PBCH in the first SSB that the first SSB does not comprise the RMSI and indicating the frequency offset information of the synchronization raster where the second SSB is located comprises:

determining that the first SSB does not comprise the associated RMSI by using a value of the PRB-grid-offsets parameter that meets a predetermined condition; and determining the frequency offset information of the synchronization raster where the second SSB is located, by using the remaining values of the PRB-grid-offset parameter and an RMSI physical downlink control channel configuration (RMSI-PDCCH-Config) parameter.

7. The information determining method according to claim 6, wherein the determining, by using the predetermined parameter of the physical broadcast channel (PBCH) in the first system synchronization block (SSB), whether the first SSB comprises the associated remaining minimum system information (RMSI) comprises:

determining whether the first SSB comprises the associated RMSI by using a value of the PRB-grid-offsets parameter.

8. The information determining method according to claim 6, wherein the determining whether the first SSB comprises the associated RMSI by using the value of the physical resource block grid offsets (PRB-grid-offsets) parameter comprises:

determining that the first SSB does not comprise the associated RMSI, in a case that a new radio (NR) band where a base station operates is lower than a predetermined frequency threshold, and g is greater than a first predetermined threshold; or determining that the first SSB does not comprise the associated RMSI, in a case that a new radio (NR) band where a base station operates is higher than a predetermined frequency threshold, and g is greater than a second predetermined threshold, wherein g is the value of the PRB-grid-offsets parameter.

9. The information determining method according to claim 6, wherein the frequency offset information of the synchronization raster where the second SSB is located comprises information of a frequency offset of the synchronization raster in an NR band where a base station operates.

10. The information determining method according to claim 9, wherein the determining, by using the predetermined parameter of the physical broadcast channel (PBCH) in the first system synchronization block (SSB), the frequency offset information of the synchronization raster where the second SSB is located comprises:

determining a difference d between an index of the synchronization raster where the second SSB is located and an index of a current synchronization raster, by the following formula:

$$d = \begin{cases} \dfrac{n}{2}, n \text{ is an even number} \\ -\dfrac{n-1}{2}, n \text{ is an odd number} \end{cases};$$

wherein n=m, in a case that the NR band where the base station operates is lower than a predetermined frequency threshold and g is equal to a first value, or the NR band where the base station operates is higher than a predetermined frequency threshold and g is equal to a second value;

n=m+c1, in a case that the NR band where the base station operates is lower than the predetermined frequency threshold and g is equal to a third value, or the NR band where the base station operates is higher than the predetermined frequency threshold and g is equal to a fourth value; and n=m+c2, in a case that the NR band where the base station operates is lower than the predetermined frequency threshold and g is equal to a fifth value, wherein g represents a value of a PRB-grid-offsets parameter, m represents a value of the RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

11. A base station, comprising: a transceiver, a memory, a processor, and a program that is stored on the memory and executable on the processor, wherein the processor is configured to, when executing the program:

indicate, by using a predetermined parameter of a physical broadcast channel (PBCH) in a first system synchronization block (SSB), whether the first SSB comprises associated remaining minimum system information (RMSI); or indicate, by using a predetermined parameter of a physical broadcast channel (PBCH) in a first system synchronization block (SSB), that the first SSB does not comprise associated remaining minimum system information (RMSI), and indicate frequency offset information of a synchronization raster where a second SSB is located, wherein the second SSB is an SSB with the associated RMSI, wherein a physical resource block grid offsets (PRB-grid-offsets) parameter has some values to indicate subcarrier offset values, and remaining values to indicate the frequency offset information of the synchronization raster, wherein the processor is further configured to:

indicate that the first SSB does not comprise the associated RMSI by using a value of the PRB-grid-offsets parameter that meets a predetermined condition; and indicate the frequency offset information of the synchronization raster where the second SSB is located, by using the remaining values of the PRB-grid-offset parameter and an RMSI physical downlink control channel configuration (RMSI-PDCCH-Config) parameter.

12. The base station according to claim 11, wherein the processor is further configured to, when executing the program:
  indicate whether the first SSB comprises the associated RMSI by using a value of the PRB-grid-offsets parameter.

13. The base station according to claim 11, wherein the processor is further configured to, when executing the program:
  indicate that the first SSB does not comprise the associated RMSI, in a case that a new radio (NR) band where the base station operates is lower than a predetermined frequency threshold, and g is greater than a first predetermined threshold; or
  indicate that the first SSB does not comprise the associated RMSI, in a case that a new radio (NR) band where the base station operates is higher than a predetermined frequency threshold, and g is greater than a second predetermined threshold,
  wherein g is the value of the PRB-grid-offsets parameter.

14. The base station according to claim 11, wherein the frequency offset information of the synchronization raster where the second SSB is located comprises information of a frequency offset of the synchronization raster in an NR band where the base station operates.

15. The base station according to claim 14, wherein the processor is further configured to, when executing the program:
  indicate a difference d between an index of the synchronization raster where the second SSB is located and an index of a current synchronization raster, by a following formula:

$$d = \begin{cases} \frac{n}{2}, & n \text{ is an even number} \\ -\frac{n-1}{2}, & n \text{ is an odd number} \end{cases};$$

wherein n=m, in a case that the NR band where the base station operates is lower than a predetermined frequency threshold and g is equal to a first value, or the NR band where the base station operates is higher than a predetermined frequency threshold and g is equal to a second value;
  n=m+c1, in a case that the NR band where the base station operates is lower than the predetermined frequency threshold and g is equal to a third value, or the NR band where the base station operates is higher than the predetermined frequency threshold and g is equal to a fourth value; and
  n=m+c2, in a case that the NR band where the base station operates is lower than the predetermined frequency threshold and g is equal to a fifth value,
  wherein g represents a value of a PRB-grid-offsets parameter, m represents a value of the RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

16. A terminal, comprising: a transceiver, a memory, a processor, and a program that is stored on the memory and executable on the processor, wherein the processor is further configured to, when executing the program, implement steps of the information determining method according to claim 6.

17. The terminal according to claim 16, wherein the processor is further configured to, when executing the program:
  determine whether the first SSB comprises the associated RMSI by using a value of a physical resource block grid offsets (PRB-grid-offsets) parameter; or
  determine that the first SSB does not comprise the associated RMSI, in a case that an NR band where a base station operates is lower than a predetermined frequency threshold, and g is greater than a first predetermined threshold, or determine that the first SSB does not comprise the associated RMSI, in a case that an NR band where a base station operates is higher than a predetermined frequency threshold, and g is greater than a second predetermined threshold, wherein g is the value of the PRB-grid-offsets parameter.

18. The terminal according to claim 16, wherein the frequency offset information of the synchronization raster where the second SSB is located comprises information of a frequency offset of the synchronization raster in an NR band where a base station operates, and
  wherein the processor is further configured to, when executing the program:
  determine a difference d between an index of the synchronization raster where the second SSB is located and an index of a current synchronization raster, by a following formula:

$$d = \begin{cases} \frac{n}{2}, & n \text{ is an even number} \\ -\frac{n-1}{2}, & n \text{ is an odd number} \end{cases};$$

wherein n=m, in a case that the NR band where the base station operates is lower than a predetermined frequency threshold and g is equal to a first value, or the NR band where the base station operates is higher than a predetermined frequency threshold and g is equal to a second value;
  n=m+c1, in a case that the NR band where the base station operates is lower than the predetermined frequency threshold and g is equal to a third value, or the NR band where the base station operates is higher than the predetermined frequency threshold and g is equal to a fourth value; and
  n=m+c2, in a case that the NR band where the base station operates is lower than the predetermined frequency threshold and g is equal to a fifth value,
  wherein g represents a value of a PRB-grid-offsets parameter, m represents a value of the RMSI-PDCCH-Config parameter, c1 and c2 are preset values, c1 and c2 are positive numbers, c1<c2, each of the first value, the third value, and the fifth value is greater than a first predetermined threshold, and each of the second value and the fourth value is greater than a second predetermined threshold.

* * * * *